Harold A. LeMaster
Philip J. Schriner
INVENTORS

Patented July 8, 1952

2,602,256

UNITED STATES PATENT OFFICE 2,602,256

FISHING LURE, INCLUDING HOOK MOUNTING MEANS

Harold A. Le Master, Clearwater, Fla., and Philip J. Schriner, Kankakee, Ill.

Application December 27, 1949, Serial No. 135,234

4 Claims. (Cl. 43—42.47)

This invention relates to new and useful improvements in fishing lures and the primary object of the present invention is to provide a hook mounting means for fishing lures so that hooks may pivot and swing relative to a lure.

Another very important object of the present invention is to provide a fishing lure including a pair of spaced metal pieces bent at an angle and secured by pivots to a lure so that forward and rear hooks received on the pivots are free to swing in any direction, except a forward direction where they would foul with either a spoon or other hooks that may be attached to the lure.

A further object of the present invention is to provide a hook mounting means for lures to obviate the fouling or entangling of hooks on a lure with each other.

A still further aim of the present invention is to provide a lure including hook mounting means that is simple and practical in construction, strong and reliable in use, neat and attractive in appearance, relatively inexpensive to manufacture, and otherwise well adapted for the purposes for which the same is intended.

Figure 1:
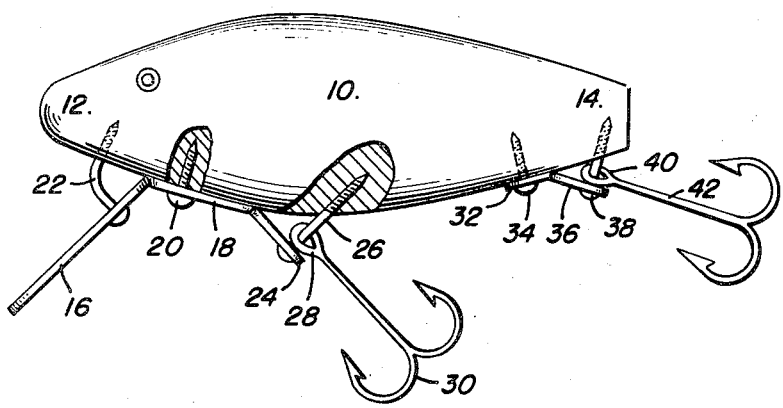
Figure 2:
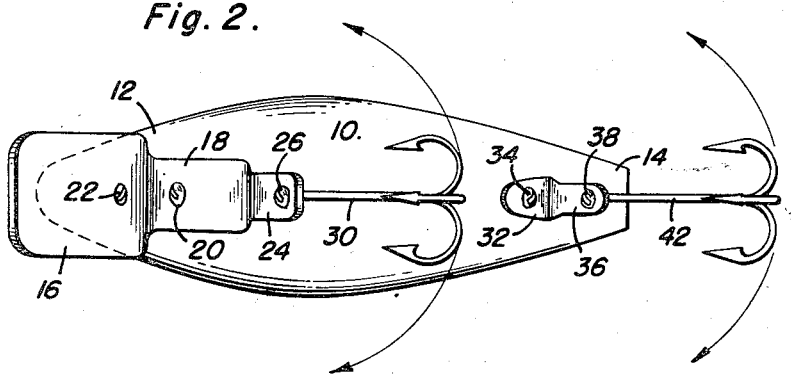

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of a lure constructed in accordance with the present invention and with parts broken away for the convenience of explanation; and, Figure 2 is a bottom plan view of Figure 1 and showing the manner in which the hooks swing about their pivots.

Referring now to the drawings in detail, wherein for the purpose of illustration, there is disclosed a preferred embodiment of the present invention, the numeral 10 represents an elongated fishing lure body having forward and rear end portions 12 and 14.

A guide spoon 16 is positioned at the forward end portion 12 of the body 10 and includes a reduced attaching flange or plate 18 that conforms to the curvature of the undersurface of the body 10 and which is secured against the undersurface of the body 10 by a fastener 20 that extends through the flange 18 and into the forward end portion 12.

The guide spoon 16 is disposed at an angle with the lure body, as is conventional for such guide spoons, and is braced and connected to the forward end portion 12 by a curved or bent fastener 22 that is extended through the guide spoon 16 and into the forward end portion 12.

A rearwardly and downwardly inclined ear or forward hook attaching plate 24 is integrally formed with the flange 18. A forward pivot or fastener 26 extends through the ear 24 and into the central portion of the body 10. The pivot 26 is disposed substantially perpendicular to the ear 24 and receives the eye portion 28 of a forward gang of hooks or hook member 30.

The opening in the eye portion 28 is considerably larger than the diameter of the hook shank portion to permit the hook 30 to swing about the pivot and toward and away from the rear portion 14 of the lure body.

A substantially L-shaped rear attaching plate or strip 32 is secured against the undersurface of the end portion 14 by a fastener 34 that extends through the plate 32 and into the end portion 14. The plate 32 includes a downwardly and rearwardly inclined leg portion 36 that is connected to the rear end portion 14 by a pivot or fastener 38 that extends through the portion 36 and into the end portion 14.

The pivot 38 receives the eye portion 40 of a rear gang of hooks or hook member 42 to permit pivotal swing and twisting movement of the hook member 42 relative to the body 10.

The hook members 30 and 42 are so mounted as to swing at various angles to the body 10, however, the same cannot swing forwardly to become entangled with one another.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fishing lure comprising a body, a guide spoon including an attaching flange, a curved nail extending through the spoon and into the undersurface of said body for connecting and bracing the spoon to the body, additional means detachably securing the flange against the body, a rearwardly and downwardly inclined ear integrally formed with said flange, a combined pivot and fastener extending through the ear and entering the body to secure the ear to the body, and a hook member having an eye portion received on said combined pivot and fastener for swinging movement.

2. A fishing lure comprising an elongated body having forward and rear ends, an attaching flange detachably secured to the undersurface of said body adjacent the forward end of said body, a downwardly and rearwardly inclined ear integrally formed with said flange, an upwardly and rearwardly inclined pivot pin extending through the ear and into the undersurface of said body intermediate the ends of said body and disposed at right angles to said ear, a hook having an eye portion received on said pin between said ear and the undersurface of said body for rotation, a downwardly and forwardly inclined spoon integrally formed with said flange and underlying the forward end of said body, and a bent rod extending through said spoon and into the undersurface of said forward end.

3. A fishing lure comprising an elongated body having forward and rear ends, an attaching flange detachably secured to the undersurface of said body adjacent the forward end of said body, a downwardly and rearwardly inclined ear integrally formed with said flange, an upwardly and rearwardly inclined headed fastener extending through said ear and into the undersurface of said body intermediate the ends of said body and securing the ear to the body, said fastener including a straight shank portion, a hook having an eye rotatably mounted on the shank portion of said fastener and disposed between the ear and the undersurface of said body, a downwardly and forwardly inclined spoon integrally formed with said flange and underlying the forward end of said body, and a headed fastener including a shank portion extending upwardly through the spoon and into the undersurface of said body at the forward end thereof.

4. A fishing lure comprising an elongated body, a substantially U-shaped attaching plate detachably secured to the body and including an inclined rear portion spaced from and underlying the body and an inclined forward portion disposed beneath the body, a fastener extending through the rear portion and into the body at an inclined angle relative to the axis of the body, a hook having an eye portion received on said fastener for swinging movement relative to the body, and an additional fastener extending upwardly through the forward portion and into the undersurface of the body and adapted to receive a line.

HAROLD A. LE MASTER.
PHILIP J. SCHRINER.

REFERENCES CITED

The following references are of record in the file of this patent:

UNITED STATES PATENTS

| Number | Name | Date |
|---|---|---|
| D. 152,713 | McCollum | Feb. 15, 1949 |
| 1,204,204 | Strube | Nov. 7, 1916 |
| 1,430,336 | Stolley | Sept. 26, 1922 |
| 1,494,605 | Jones | May 20, 1924 |
| 2,189,487 | Davenport | Feb. 6, 1940 |
| 2,217,789 | Bobo | Oct. 15, 1940 |
| 2,538,171 | Stroup et al. | Jan. 16, 1951 |